United States Patent
Lin et al.

(10) Patent No.: US 9,559,583 B2
(45) Date of Patent: Jan. 31, 2017

(54) POWER CONVERTER WITH A WAVE GENERATOR THAT FILTERS A WAVE SIGNAL TO GENERATE AN OUTPUT VOLTAGE

(71) Applicant: MediaTek Inc., Hsin-Chu (TW)

(72) Inventors: Hung-chih Lin, Citong Township, Yunlin County (TW); Hung-I Wang, Zhudong Township, Hsinchu County (TW); Hao-Ping Hong, Jhubei (TW); Chien-Wei Kuan, Hsinchu (TW); Yung-Chih Yen, Tainan (TW)

(73) Assignee: MEDIATEK INC., Hsin-chu (TW)

(*) Notice: Subject to any disclaimer, the term of this patent is extended or adjusted under 35 U.S.C. 154(b) by 87 days.

(21) Appl. No.: 14/153,405

(22) Filed: Jan. 13, 2014

(65) Prior Publication Data
US 2015/0200608 A1  Jul. 16, 2015

(51) Int. Cl.
*H02M 7/539* (2006.01)
*H02M 3/156* (2006.01)

(52) U.S. Cl.
CPC ........... *H02M 3/156* (2013.01); *H02M 3/1563* (2013.01)

(58) Field of Classification Search
CPC   H02M 7/539; H02M 3/33507; H02M 1/4225; H02M 1/32; H02M 3/156; H02M 3/1563; G05F 1/40
USPC ............. 363/131, 16, 80, 127; 323/271, 225
See application file for complete search history.

(56) References Cited

U.S. PATENT DOCUMENTS

| | | | |
|---|---|---|---|
| 5,568,044 A * | 10/1996 | Bittner | 323/272 |
| 7,457,140 B2 | 11/2008 | Klein | |
| 7,902,805 B2 | 3/2011 | Gibson et al. | |
| 2003/0231012 A1* | 12/2003 | Corva | H02M 3/156 323/285 |
| 2009/0160414 A1* | 6/2009 | Hachiya | H02M 3/156 323/283 |
| 2012/0026766 A1* | 2/2012 | Adragna | H02M 1/4225 363/84 |
| 2013/0147456 A1* | 6/2013 | Chien | H02M 3/1588 323/288 |
| 2014/0070780 A1* | 3/2014 | Yanagida | H02M 3/1588 323/271 |
| 2014/0185158 A1* | 7/2014 | Li | G11B 5/6011 360/39 |
| 2015/0061628 A1* | 3/2015 | Nguyen | H02M 3/1563 323/282 |

\* cited by examiner

*Primary Examiner* — Jessica Han
*Assistant Examiner* — Demetries A Gibson
(74) *Attorney, Agent, or Firm* — McClure, Qualey & Rodack, LLP

(57) ABSTRACT

A power converter includes a wave generator, a low pass filter, a first control circuit, and a second control circuit. The wave generator receives an input voltage, and converts the input signal into a wave signal according to a first control signal and a second control signal. The low pass filter filters the wave signal to generate an output voltage. The first control circuit generates the first control signal according to the wave signal and the output voltage. The second control circuit generates the second control signal according to the wave signal and the output voltage.

13 Claims, 10 Drawing Sheets

POWER CONVERTER WITH A WAVE GENERATOR THAT FILTERS A WAVE SIGNAL TO GENERATE AN OUTPUT VOLTAGE

BACKGROUND OF THE INVENTION

Field of the Invention

The disclosure generally relates to a power converter, and more particularly, relates to a DC-to-DC (Direct Current to Direct Current) converter.

Description of the Related Art

Power converters are essential for many modern electronic devices. Among other capabilities, power converters can adjust voltage levels downward or adjust voltage levels upward. Power converters may also convert from AC (Alternating Current) power to DC (Direct Current) power, or vice versa. Power converters are typically implemented using one or more switching devices, such as transistors, which are turned on and off to deliver power to the output of the converter. Power converters may also include one or more capacitors or inductors.

BRIEF SUMMARY OF THE INVENTION

In one exemplary embodiment, the disclosure is directed to a power converter, including: a wave generator, receiving an input voltage, and converting the input signal into a wave signal according to a first control signal and a second control signal; a low pass filter, filtering the wave signal to generate an output voltage; a first control circuit, generating the first control signal according to the wave signal and the output voltage; and a second control circuit, generating the second control signal according to the wave signal and the output voltage.

By controlling the power converter with two feedback circuits, the power converter is capable of providing a stable and precise output voltage. One of the two feedback circuits is responsible for controlling the falling edges of the wave signal, and the other of the two feedback circuits is responsible for controlling the rising edges of the wave signal.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Figure 1:
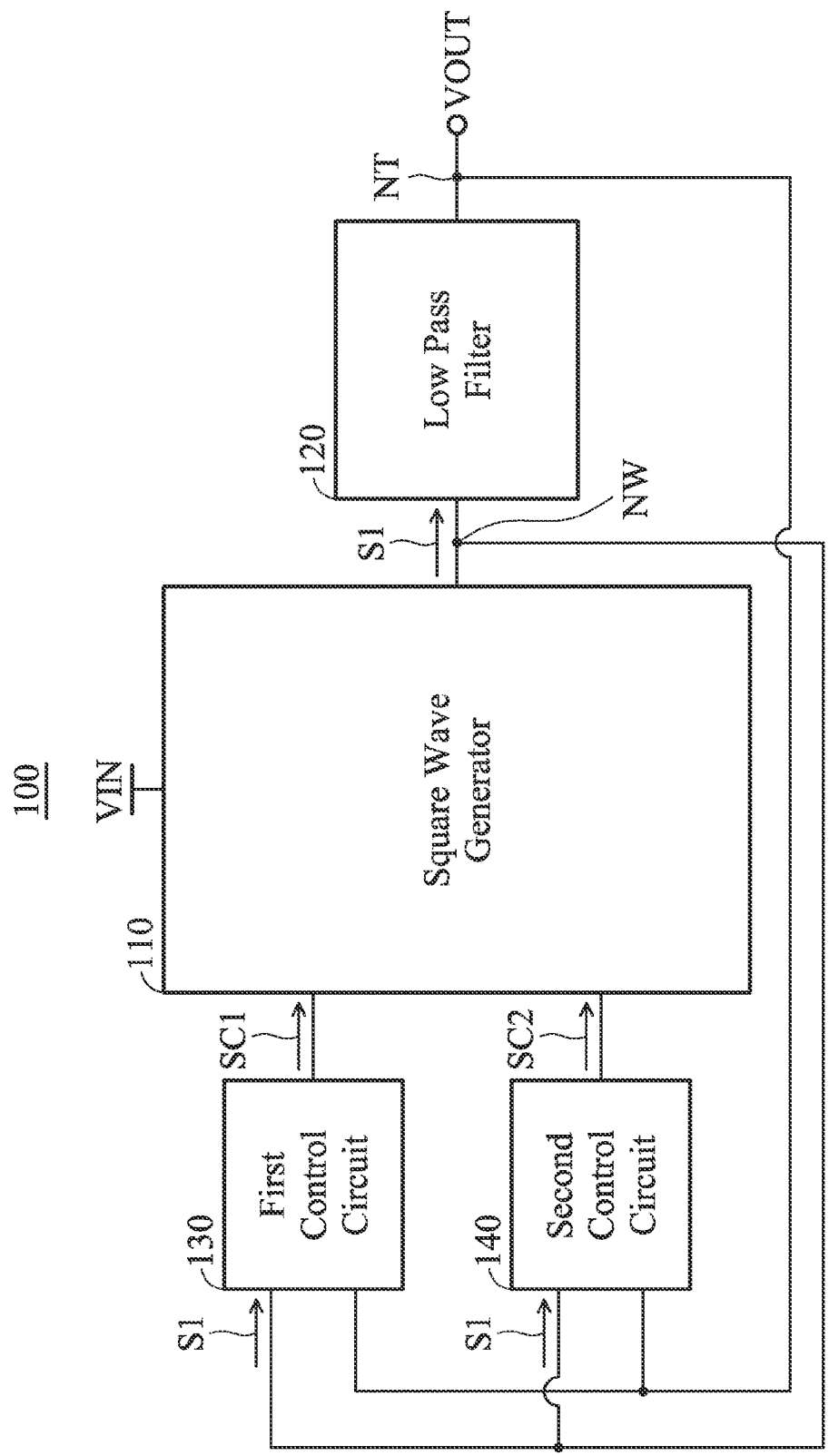
FIG. 1 is a diagram for illustrating a power converter according to an embodiment of the invention.

FIG. 1 is a diagram for illustrating a power converter 100 according to an embodiment of the invention. Preferably, the power converter 100 is a DC-to-DC (Direct Current to Direct Current) converter. As shown in FIG. 1, the power converter 100 at least includes a square wave generator 110, a low pass filter 120, a first control circuit 130, and a second control circuit 140. The square wave generator 110 receives an input voltage VIN. The input voltage VIN may be a DC (Direct Current) supply voltage from a DC power supply circuit. The square wave generator 110 converts the input signal VIN into a square wave signal S1 at a switch node NW according to a first control signal SC1 and a second control signal SC2. The low pass filter 120 filters the square wave signal S1 so as to generate an output voltage VOUT at an output node NT. Ideally, the output voltage VOUT may just include a DC component of the square wave signal S1. The switch node NW and the output node NT are further fed back to the first control circuit 130 and the second control circuit 140, and therefore the square wave signal S1 and the output voltage VOUT is further transmitted back to the first control circuit 130 and the second control circuit 140. The first control circuit 130 generates the first control signal SC1 according to the square wave signal S1 and the output voltage VOUT. The second control circuit 140 generates the second control signal SC2 according to the square wave signal S1 and the output voltage VOUT. To be brief, the power converter 100 is controlled by two separate feedback circuits therein, and is configured to provide the stable and precise output voltage VOUT. The first control circuit 130 is responsible for controlling falling edges of the square wave signal S1, and the second control circuit 140 is responsible for controlling rising edges of the square wave signal S1. The detailed structure of each block in FIG. 1 will be described in the following embodiment. It is understood each block may be implemented in many ways, and the following embodiments and figures are just exemplary, rather than limitations of the invention.

Figure 2:
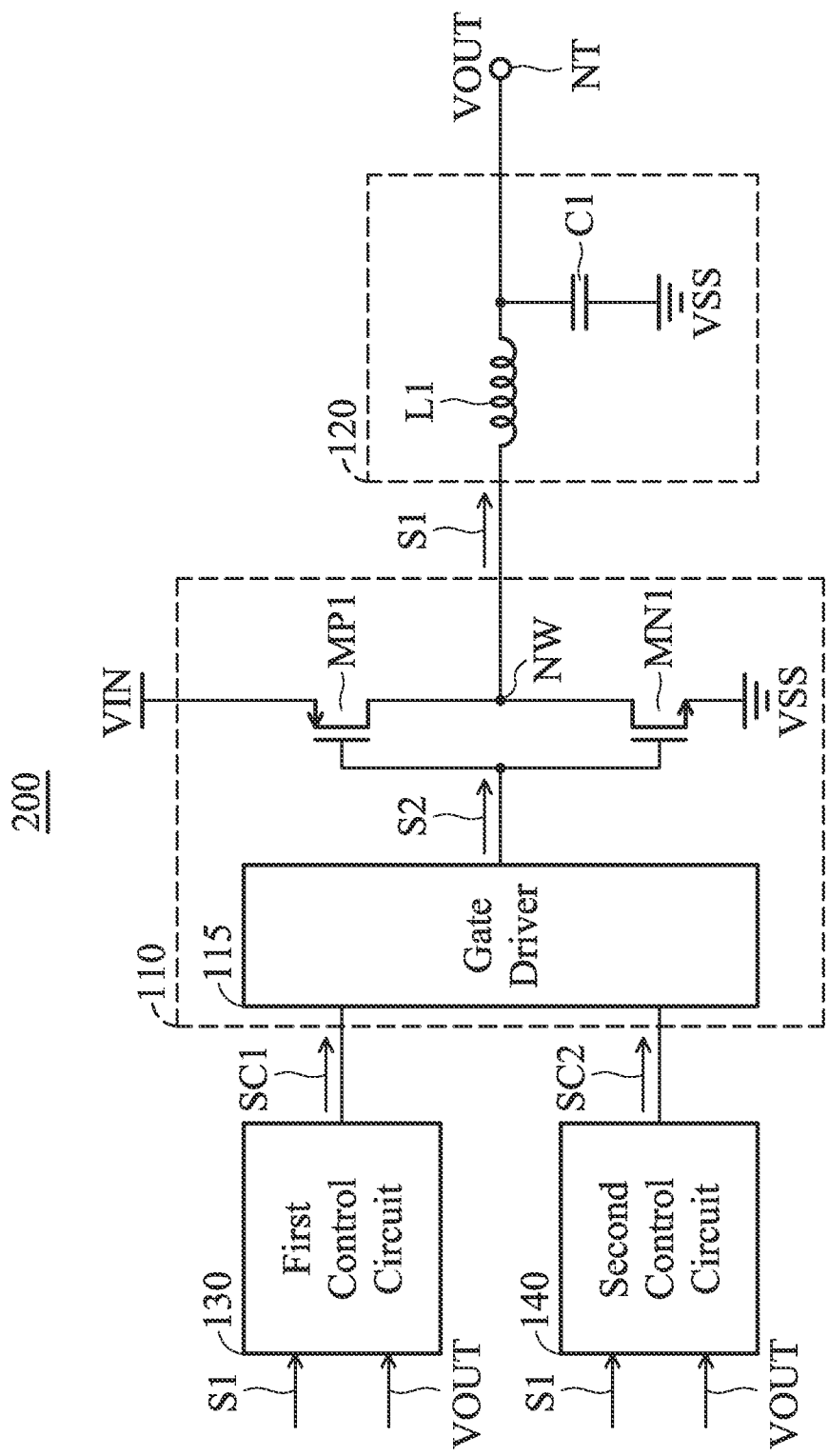
FIG. 2 is a diagram for illustrating a power converter according to an embodiment of the invention.

FIG. 2 is a diagram for illustrating a power converter 200 according to an embodiment of the invention. In the embodiment of FIG. 2, the square wave generator 110 includes a gate driver 115, a first PMOS transistor (P-channel Metal-Oxide-Semiconductor Field-Effect Transistor) MP1, and a first NMOS transistor (N-channel Metal-Oxide-Semiconductor Field-Effect Transistor) MN1. The gate driver 115 generates a driving signal S2 according to the first control signal SC1 and the second control signal SC2. For example, when the gate driver 115 receives a pulse of a reverse first control signal SC1, the gate driver 115 may transfer the driving signal S2 from a low logic level to a high logic level, and when the gate driver 115 receives a pulse of a reverse second control signal SC2, the gate driver 115 may transfer the driving signal S2 from a high logic level to a low logic level. The first PMOS transistor MP1 has a gate for receiving the driving signal S2, a source coupled to the input voltage VIN, and a drain coupled to the switch node NW. The first NMOS transistor MN1 has a gate for receiving the driving signal S2, a source coupled to a ground voltage VSS (e.g., 0V), and a drain coupled to the switch node NW. The switch node NW is used to output the square wave signal S1 from the square wave generator 110. An inverter may be formed by the first PMOS transistor MP1 and the first NMOS transistor MN1. The driving signal S2 may be a large current for driving and controlling an input terminal of the inverter. The square wave generator 110 may generate the square wave signal S1 by switching on and off the inverter periodically according to the driving signal S2. As a result, the square wave signal S1 may have a high logic level equal to the input voltage VIN, and a low logic level equal to the ground voltage VSS. In the embodiment of FIG. 2, the low pass filter 120 includes a first inductor L1 and a first capacitor C1. The first inductor L1 is coupled between the switch node NW and the output node NT. The first capacitor C1 is coupled between the output node NT and the ground voltage VSS. The output node NT is used to output the output voltage VOUT from the low pass filter 120. The low pass filter 120 may substantially remove an AC (Alternating Current) component from the square wave signal S1, and therefore the output voltage VOUT is substantially composed of a DC component of the square wave signal S1.

The first control circuit 130 and the second control circuit 140, forming two separate feedback paths, may be implemented with a variety of circuit components. Please refer to the following embodiments and figures to understand them.

Figure 3A:
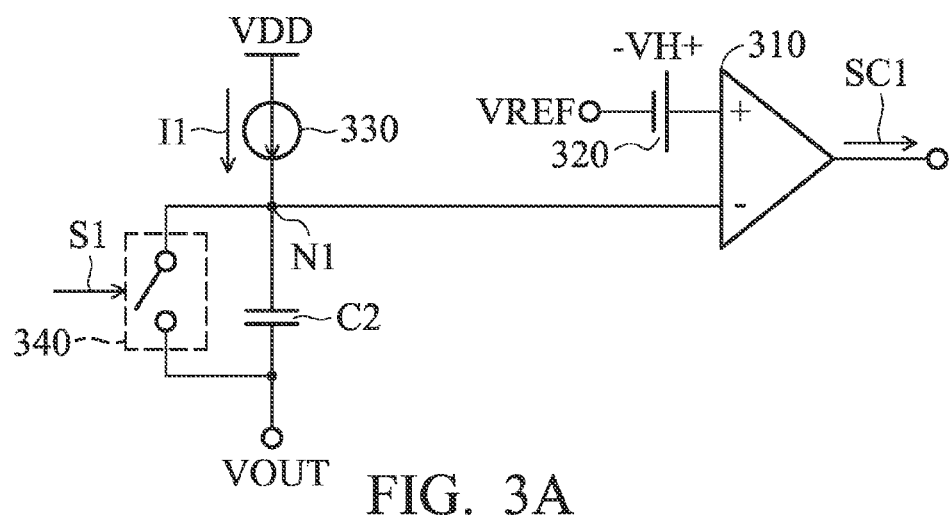
FIG. 3A is a diagram for illustrating a first control circuit according to an embodiment of the invention.

FIG. 3A is a diagram for illustrating a first control circuit 130A according to an embodiment of the invention. In the embodiment of FIG. 3A, the first control circuit 130A includes a first comparator 310, a first DC voltage source 320, a first current source 330, a first switch 340, and a second capacitor C2. The first comparator 310 has a first positive input terminal, a first negative input terminal coupled to a first node N1, and a first output terminal for outputting the first control signal SC1. The first DC voltage source 320 provides a voltage difference VH. The first DC voltage source 320 has a positive electrode coupled to the first positive input terminal, and a negative electrode coupled to a reference voltage VREF. The first current source 330 outputs a first current I1 to the first node N1. The second capacitor C2 is coupled between the first node N1 and the output voltage VOUT. The first switch 340 is coupled between the first node N1 and the output voltage VOUT, and is selectively closed and opened according to the square wave signal S1.

Figure 4A:
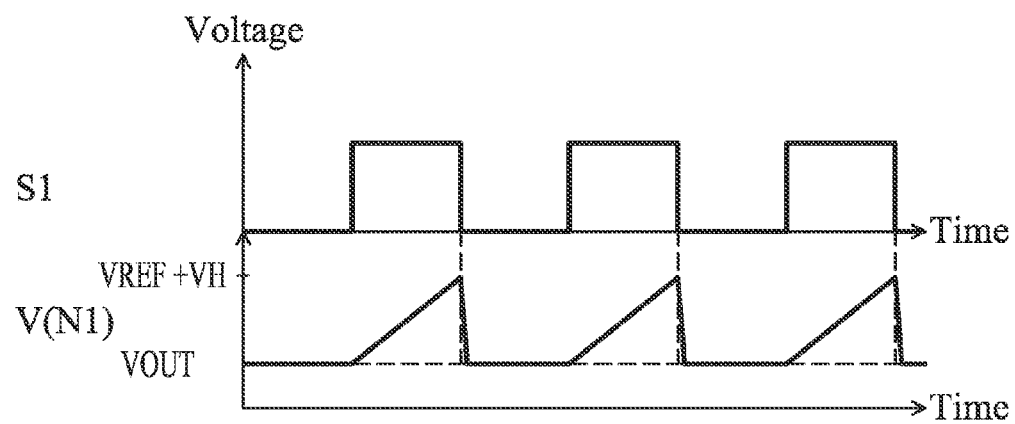
FIG. 4A is a diagram for illustrating operation of a first control circuit according to an embodiment of the invention.

FIG. 4A is a diagram for illustrating operation of the first control circuit 130A according to an embodiment of the invention. Please refer to FIG. 3A and FIG. 4A together. The output voltage VOUT includes a DC component and a relatively small AC component, and the reference voltage VREF is approximately equal to the DC component. The square wave signal S1 includes interleaved high and low logic periods. The first switch 340 is controlled by the square wave signal S1, and it is opened during the high logic periods of the square wave signal S1 and is closed during the low logic periods of the square wave signal S1. When the first switch 340 is opened, the second capacitor C2 is charged by the first current I1, and the voltage at the first node N1 is gradually increased from the original output voltage VOUT. Then, the voltage at the first node N1 is pulled up to a threshold voltage, which is the reference voltage VREF plus the voltage difference VH. At this time, the first comparator 310 generates a reverse first control signal SC1 so as to control the square wave generator 110 to finish the current high logic period of the square wave signal S1, and the first switch 340 is closed accordingly. More particularly, a pulse of the reverse first control signal SC1 may pull up the driving signal S2 of the gate driver 115 to turn off the first PMOS transistor MP1 and turn on the first NMOS transistor MN1, such that the current high logic period of the square wave signal S1 is terminated. When the first switch 340 is closed, the voltage at the first node N1 is reset to the original output voltage VOUT, and it may not change until the next time the square wave signal S1 enters the high logic periods.

Figure 3B:
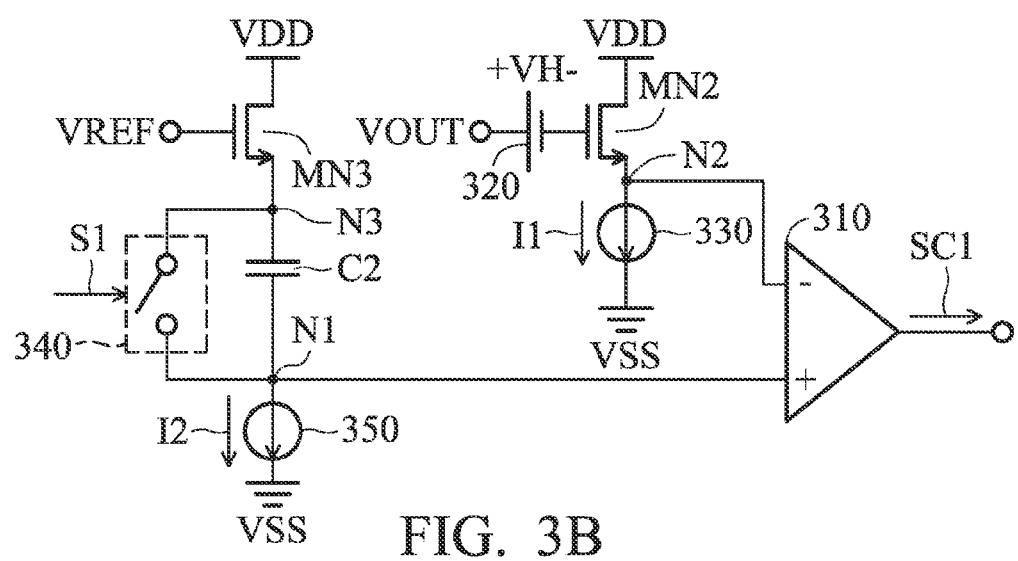
FIG. 3B is a diagram for illustrating a first control circuit according to an embodiment of the invention.

FIG. 3B is a diagram for illustrating a first control circuit 130B according to an embodiment of the invention. In the embodiment of FIG. 3B, the first control circuit 130B includes a first comparator 310, a first DC voltage source 320, a first current source 330, a first switch 340, a second current source 350, a second NMOS transistor MN2, a third NMOS transistor MN3, and a second capacitor C2. The first comparator 310 has a first positive input terminal coupled to a first node N1, a first negative input terminal coupled to a second node N2, and a first output terminal for outputting the first control signal SC1. The second NMOS transistor MN2 has a gate, a source coupled to the second node N2, and a drain coupled to a supply voltage VDD. The supply voltage VDD may be the same as or different from the input voltage VIN. The first current source 330 draws a first current I1 from the second node N2. The first DC voltage source 320 provides a voltage difference VH. The first DC voltage source 320 has a positive electrode coupled to the output voltage VOUT, and a negative electrode coupled to the gate of the second NMOS transistor MN2. The third NMOS transistor MN3 has a gate coupled to a reference voltage VREF, a source coupled to a third node N3, and a drain coupled to the supply voltage VDD. The second capacitor C2 is coupled between the third node N3 and the first node N1. The first switch 340 is coupled between the third node N3 and the first node N1, and is selectively closed and opened according to the square wave signal S1. The second current source 350 draws a second current I2 from the first node N1.

Figure 4B:
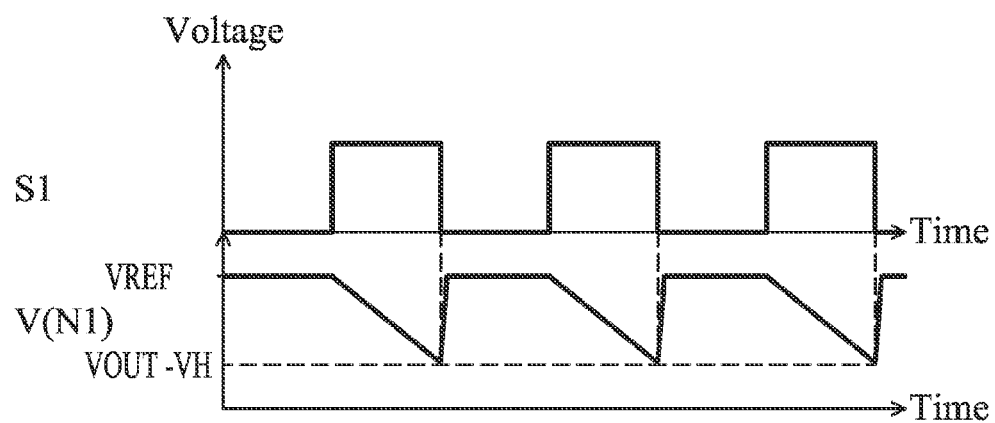
FIG. 4B is a diagram for illustrating operation of a first control circuit according to an embodiment of the invention.

FIG. 4B is a diagram for illustrating operation of the first control circuit 130B according to an embodiment of the invention. Please refer to FIG. 3B and FIG. 4B together. The output voltage VOUT includes a DC component and a relatively small AC component, and the reference voltage VREF is approximately equal to the DC component. The square wave signal S1 includes interleaved high and low logic periods. The first switch 340 is controlled by the square wave signal S1, and it is opened during the high logic periods of the square wave signal S1 and is closed during the low logic periods of the square wave signal S1. When the first switch 340 is opened, the second capacitor C2 is charged by the second current I2, and the voltage at the first node N1 is gradually decreased from the original reference voltage VREF (the second NMOS transistor MN2 and the third NMOS transistor MN3 are respectively coupled to the first negative input terminal and the first positive input terminal of the first comparator 310, and since they provide equal gate-to-source voltage differences, the gate-to-source voltage differences can both be omitted in this discussion; that is, it is assumed that the gate-to-source voltage differences are equal to 0, and the result is unchanged). Then, the voltage at the first node N1 is pulled down to a threshold voltage, which is the output voltage VOUT minus the voltage difference VH. At this time, the first comparator 310 generates a reverse first control signal SC1 so as to control the square wave generator 110 to finish the current high logic period of the square wave signal S1, and the first switch 340 is closed accordingly. More particularly, a pulse of the reverse first control signal SC1 may pull up the driving signal S2 of the gate driver 115 to turn off the first PMOS transistor MP1 and turn on the first NMOS transistor MN1, such that the current high logic period of the square wave signal S1 is terminated. When the first switch 340 is closed, the voltage at the first node N1 is reset to the reference voltage VREF, and it may not change until the next time the square wave signal S1 enters the high logic periods.

Figure 3C:
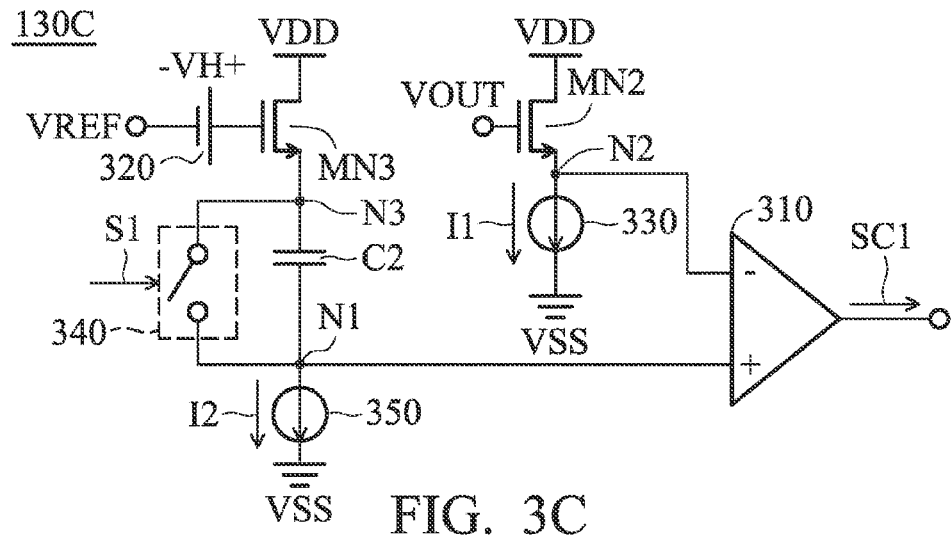
FIG. 3C is a diagram for illustrating a first control circuit according to an embodiment of the invention.

FIG. 3C is a diagram for illustrating a first control circuit 130C according to an embodiment of the invention. In the embodiment of FIG. 3C, the first control circuit 130C includes a first comparator 310, a first DC voltage source 320, a first current source 330, a first switch 340, a second current source 350, a second NMOS transistor MN2, a third NMOS transistor MN3, and a second capacitor C2. The first comparator 310 has a first positive input terminal coupled to a first node N1, a first negative input terminal coupled to a second node N2, and a first output terminal for outputting the first control signal SC1. The second NMOS transistor MN2 has a gate coupled to the output voltage VOUT, a source coupled to the second node N2, and a drain coupled to a supply voltage VDD. The supply voltage VDD may be the same as or different from the input voltage VIN. The first current source 330 draws a first current I1 from the second node N2. The third NMOS transistor MN3 has a gate, a source coupled to a third node N3, and a drain coupled to the supply voltage VDD. The first DC voltage source 320 provides a voltage difference VH. The first DC voltage source 320 has a positive electrode coupled to the gate of the third NMOS transistor MN3, and a negative electrode coupled to a reference voltage VREF. The second capacitor C2 is coupled between the third node N3 and the first node N1. The first switch 340 is coupled between the third node N3 and the first node N1, and is selectively closed and opened according to the square wave signal S1. The second current source 350 draws a second current I2 from the first node N1.

Figure 4C:
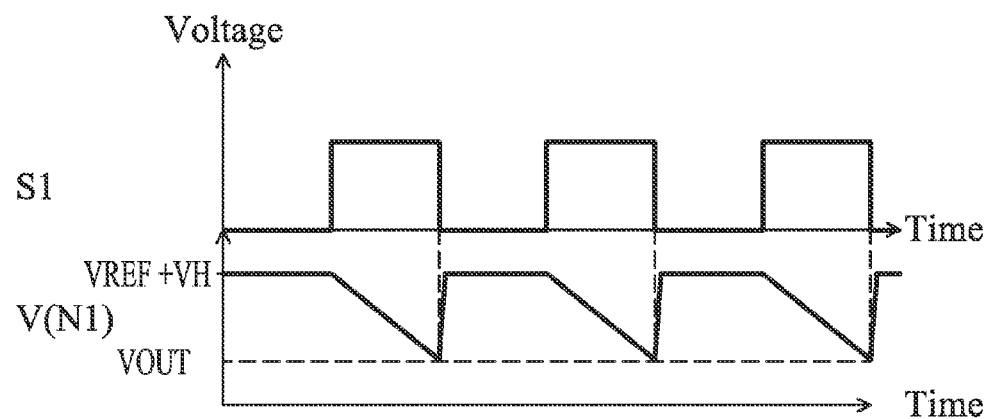
FIG. 4C is a diagram for illustrating operation of a first control circuit according to an embodiment of the invention.

FIG. 4C is a diagram for illustrating operation of the first control circuit 130C according to an embodiment of the invention. Please refer to FIG. 3C and FIG. 4C together. The output voltage VOUT includes a DC component and a relatively small AC component, and the reference voltage VREF is approximately equal to the DC component. The square wave signal S1 includes interleaved high and low logic periods. The first switch 340 is controlled by the square wave signal S1, and it is opened during the high logic periods of the square wave signal S1 and is closed during the low logic periods of the square wave signal S1. When the first switch 340 is opened, the second capacitor C2 is charged by the second current I2, and the voltage at the first node N1 is gradually decreased from the original reference voltage VREF plus voltage difference VH (the second NMOS transistor MN2 and the third NMOS transistor MN3 are respectively coupled to the first negative input terminal and the first positive input terminal of the first comparator 310, and since they provide equal gate-to-source voltage differences, the gate-to-source voltage differences can both be omitted in this discussion; that is, it is assumed that the gate-to-source voltage differences are equal to 0, and the result is unchanged). Then, the voltage at the first node N1 is pulled down to a threshold voltage, which is the output voltage VOUT. At this time, the first comparator 310 generates a reverse first control signal SC1 so as to control the square wave generator 110 to finish the current high logic period of the square wave signal S1, and the first switch 340 is closed accordingly. More particularly, a pulse of the reverse first control signal SC1 may pull up the driving signal S2 of the gate driver 115 to turn off the first PMOS transistor MP1 and turn on the first NMOS transistor MN1, such that the current high logic period of the square wave signal S1 is terminated. When the first switch 340 is closed, the voltage at the first node N1 is reset to the reference voltage VREF plus the voltage difference VH, and it may not change until the next time the square wave signal S1 enters the high logic periods.

Figure 3D:
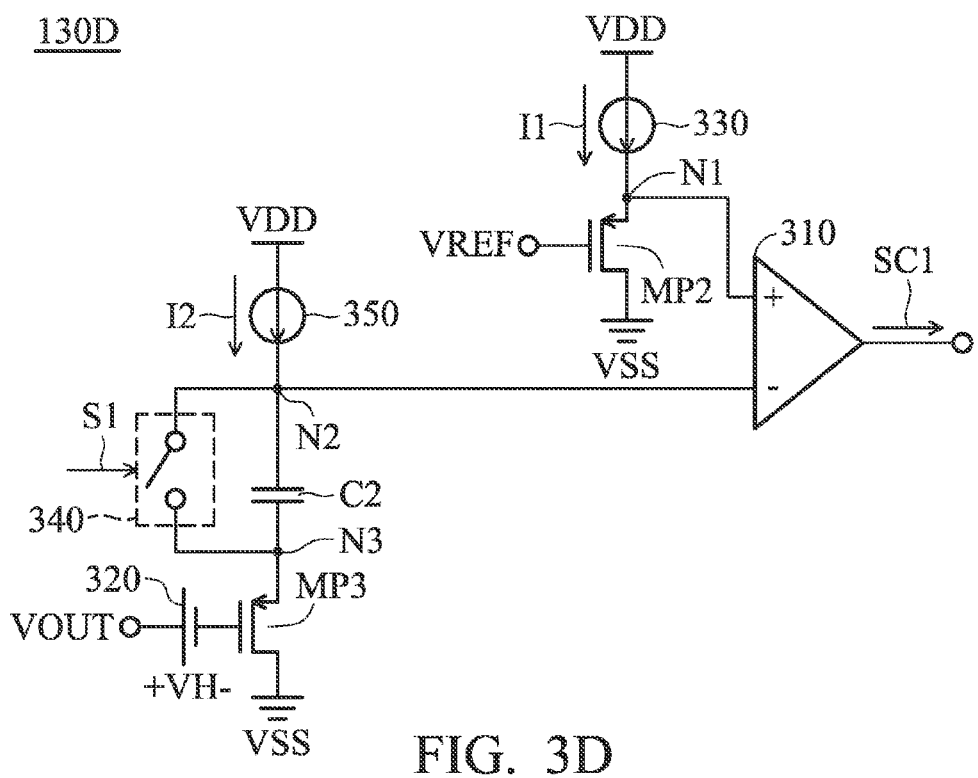
FIG. 3D is a diagram for illustrating a first control circuit according to an embodiment of the invention.

FIG. 3D is a diagram for illustrating a first control circuit 130D according to an embodiment of the invention. In the embodiment of FIG. 3D, the first control circuit 130D includes a first comparator 310, a first DC voltage source 320, a first current source 330, a first switch 340, a second current source 350, a second PMOS transistor MP2, a third PMOS transistor MP3, and a second capacitor C2. The first comparator 310 has a first positive input terminal coupled to a first node N1, a first negative input terminal coupled to a second node N2, and a first output terminal for outputting the first control signal SC1. The first current source 330 outputs a first current I1 to the first node N1. The second PMOS transistor MP2 has a gate coupled to a reference voltage VREF, a source coupled to the first node N1, and a drain coupled to the ground voltage VSS. The second current source 350 outputs a second current I2 to the second node N2. The second capacitor C2 is coupled between the second node N2 and a third node N3. The first switch 340 is coupled between the second node N2 and the third node N3, and is selectively closed and opened according to the square wave signal S1. The third PMOS transistor MP3 has a gate, a source coupled to the third node N3, and a drain coupled to the ground voltage VSS. The first DC voltage source 320 provides a voltage difference VH. The first DC voltage source 320 has a positive electrode coupled to the output voltage VOUT, and a negative electrode coupled to the gate of the third PMOS transistor MP3.

Figure 4D:
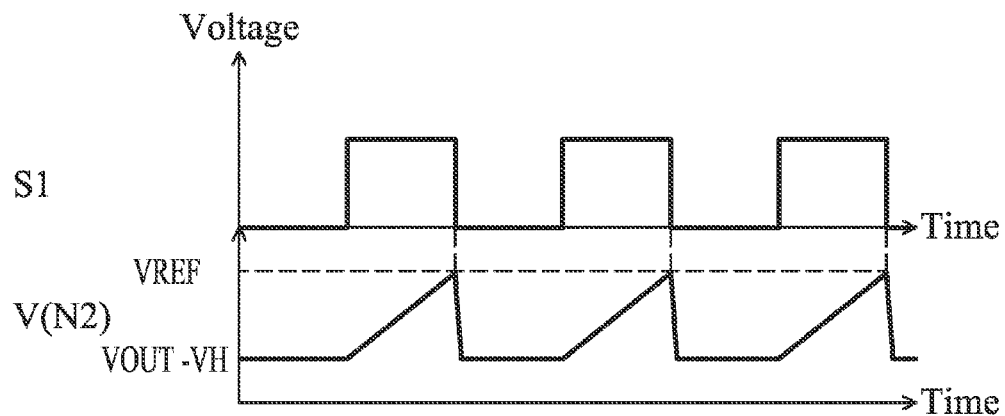
FIG. 4D is a diagram for illustrating operation of a first control circuit according to an embodiment of the invention.

FIG. 4D is a diagram for illustrating operation of the first control circuit 130D according to an embodiment of the invention. Please refer to FIG. 3D and FIG. 4D together. The output voltage VOUT includes a DC component and a relatively small AC component, and the reference voltage VREF is approximately equal to the DC component. The square wave signal S1 includes interleaved high and low logic periods. The first switch 340 is controlled by the square wave signal S1, and it is opened during the high logic periods of the square wave signal S1 and is closed during the low logic periods of the square wave signal S1. When the first switch 340 is opened, the second capacitor C2 is charged by the second current I2, and the voltage at the second node N2 is gradually increased from the original output voltage VOUT minus voltage difference VH (the second PMOS transistor MP2 and the third PMOS transistor MP3 are respectively coupled to the first positive input terminal and the first negative input terminal of the first comparator 310, and since they provide equal gate-to-source voltage differences, the gate-to-source voltage differences can both be omitted in this discussion; that is, it is assumed that the gate-to-source voltage differences are equal to 0, and the result is unchanged). Then, the voltage at the second node N2 is pulled up to a threshold voltage, which is the reference voltage VREF. At this time, the first comparator 310 generates a reverse first control signal SC1 so as to control the square wave generator 110 to finish the current high logic period of the square wave signal S1, and the first switch 340 is closed accordingly. More particularly, a pulse of the reverse first control signal SC1 may pull up the driving signal S2 of the gate driver 115 to turn off the first PMOS transistor MP1 and turn on the first NMOS transistor MN1, such that the current high logic period of the square wave signal S1 is terminated. When the first switch 340 is closed, the voltage at the second node N2 is reset to the output voltage VOUT minus the voltage difference VH, and it may not change until the next time the square wave signal S1 enters the high logic periods.

According to the embodiments of FIGS. 3A-3D and 4A-4D, the first control circuit 130 is configured to determine the end of each high logic period of the square wave signal S1. For all embodiments discussed above, the first current I1 of the first current source 330 and the second current I2 of the second current source 350 may be set according to equation (1):

$$I1=I2=(VIN-VOUT)\times K1 \qquad (1)$$

where K1 is a first constant.

That is, each of the first current I1 and the second current I2 is proportional to the difference between the input voltage VIN and the output voltage VOUT. According to some measurement results, such a design can cause the high logic periods of the square wave signal S1 to be well controlled, and it can therefore improve the reliability of the power converter 100. Generally speaking, the square wave signal S1 controls a charging operation of the capacitor in the first control circuit 130, and the comparator of the first control circuit 130 then generates the first control signal SC1 according to a voltage of the capacitor, the output voltage VOUT and a predetermined voltage difference VTH.

Figure 5A:
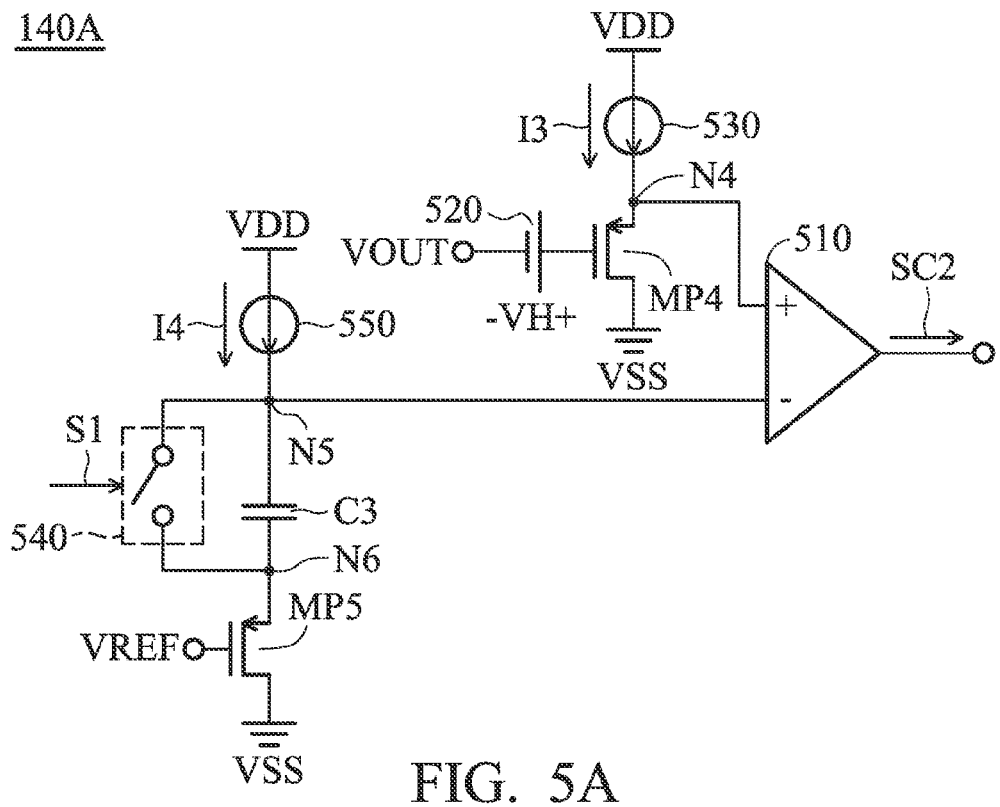
FIG. 5A is a diagram for illustrating a second control circuit according to an embodiment of the invention.

FIG. 5A is a diagram for illustrating a second control circuit 140A according to an embodiment of the invention. In the embodiment of FIG. 5A, the second control circuit 140A includes a second comparator 510, a second DC voltage source 520, a third current source 530, a second switch 540, a fourth current source 550, a third capacitor C3, a fourth PMOS transistor MP4, and a fifth PMOS transistor MP5. The second comparator 510 has a second positive input terminal coupled to a fourth node N4, a second negative input terminal coupled to a fifth node N5, and a second output terminal for outputting the second control signal SC2. The third current source 530 outputs a third current I3 to the fourth node N4. The fourth PMOS transistor MP4 has a gate, a source coupled to the fourth node N4, and a drain coupled to the ground voltage VSS. The second DC voltage source 520 provides a voltage difference VH. The second DC voltage source 520 has a positive electrode coupled to the gate of the fourth PMOS transistor MP4, and a negative electrode coupled to the output voltage VOUT. The fourth current source 550 outputs a fourth current I4 to the fifth node N5. The third capacitor C3 is coupled between the fifth node N5 and a sixth node N6. The second switch 540 is coupled between the fifth node N5 and the sixth node N6, and is selectively closed and opened according to the square wave signal S1. The fifth PMOS transistor MP5 has a gate coupled to a reference voltage VREF, a source coupled to the sixth node N6, and a drain coupled to the ground voltage VSS.

Figure 6A:
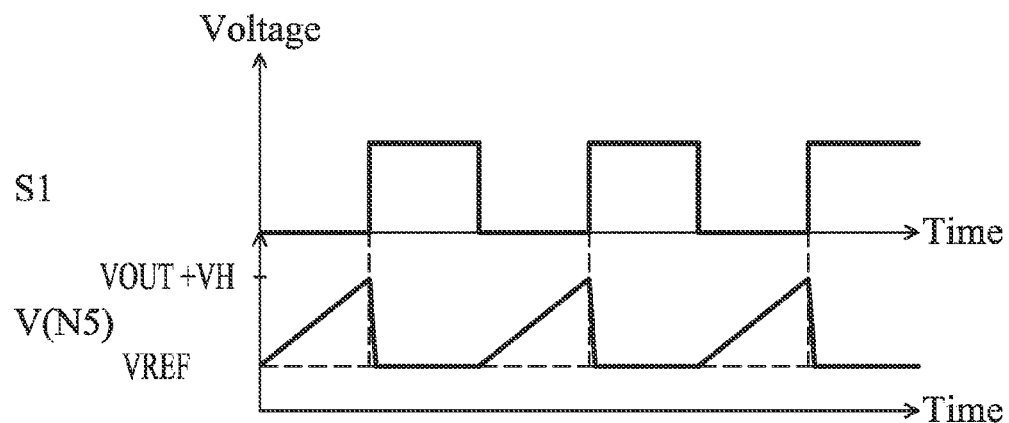
FIG. 6A is a diagram for illustrating operation of a second control circuit according to an embodiment of the invention.

FIG. 6A is a diagram for illustrating operation of the second control circuit 140A according to an embodiment of the invention. Please refer to FIG. 5A and FIG. 6A together. The output voltage VOUT includes a DC component and a relatively small AC component, and the reference voltage VREF is approximately equal to the DC component. The square wave signal S1 includes interleaved high and low logic periods. The second switch 540 is controlled by the square wave signal S1, and it is opened during the low logic periods of the square wave signal S1 and is closed during the high logic periods of the square wave signal S1. When the second switch 540 is opened, the third capacitor C3 is charged by the fourth current I4, and the voltage at the fifth node N5 is gradually increased from the original reference voltage VREF (the fourth PMOS transistor MP4 and the fifth PMOS transistor MP5 are respectively coupled to the second positive input terminal and the second negative input terminal of the second comparator 510, and since they provide equal gate-to-source voltage differences, the gate-to-source voltage differences can both be omitted in this discussion; that is, it is assumed that the gate-to-source voltage differences are equal to 0, and the result is unchanged). Then, the voltage at the fifth node N5 is pulled up to a threshold voltage, which is the output voltage VOUT plus the voltage difference VH. At this time, the second comparator 510 generates a reverse second control signal SC2 so as to control the square wave generator 110 to finish the current low logic period of the square wave signal S1, and the second switch 540 is closed accordingly. More particularly, a pulse of the reverse second control signal SC2 may pull down the driving signal S2 of the gate driver 115 to turn on the first PMOS transistor MP1 and turn off the first NMOS transistor MN1, such that the current low logic period of the square wave signal S1 is terminated. When the second switch 540 is closed, the voltage at the fifth node N5 is reset to the reference voltage VREF, and it may not change until the next time the square wave signal S1 enters the low logic periods.

Figure 5B:
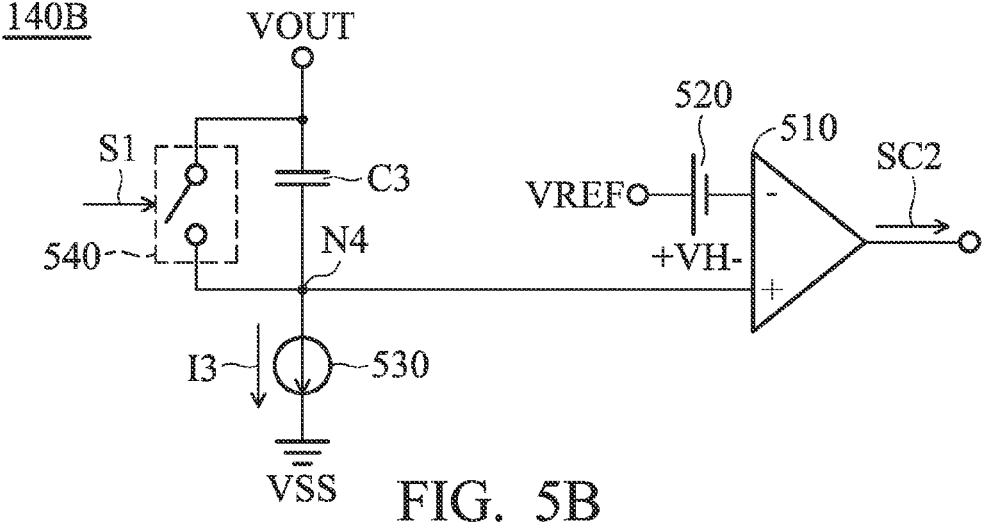
FIG. 5B is a diagram for illustrating a second control circuit according to an embodiment of the invention.

FIG. 5B is a diagram for illustrating a second control circuit 140B according to an embodiment of the invention. In the embodiment of FIG. 5B, the second control circuit 140B includes a second comparator 510, a second DC voltage source 520, a third current source 530, a second switch 540, and a third capacitor C3. The second comparator 510 has a second positive input terminal coupled to a fourth node N4, a second negative input terminal, and a second output terminal for outputting the second control signal SC2. The second DC voltage source 520 provides a voltage difference VH. The second DC voltage source 520 has a positive electrode coupled to a reference voltage VREF, and a negative electrode coupled to the second negative input terminal. The third capacitor C3 is coupled between the output voltage VOUT and the fourth node N4. The second switch 540 is coupled between the output voltage VOUT and the fourth node N4, and is selectively closed and opened according to the square wave signal S1. The third current source 530 draws a third current I3 from the fourth node N4.

Figure 6B:
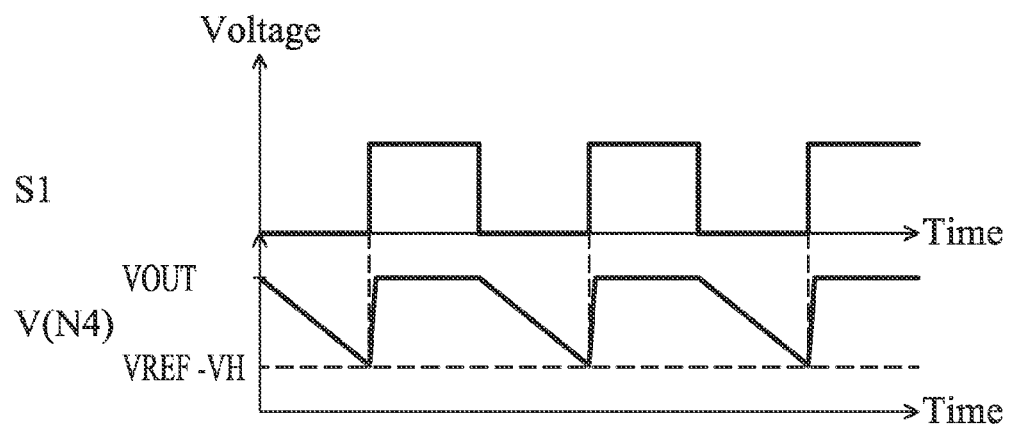
FIG. 6B is a diagram for illustrating operation of a second control circuit according to an embodiment of the invention.

FIG. 6B is a diagram for illustrating operation of the second control circuit 140B according to an embodiment of the invention. Please refer to FIG. 5B and FIG. 6B together. The output voltage VOUT includes a DC component and a relatively small AC component, and the reference voltage VREF is approximately equal to the DC component. The square wave signal S1 includes interleaved high and low logic periods. The second switch 540 is controlled by the square wave signal S1, and it is opened during the low logic periods of the square wave signal S1 and is closed during the high logic periods of the square wave signal S1. When the second switch 540 is opened, the third capacitor C3 is charged by the third current I3, and the voltage at the fourth node N4 is gradually decreased from the original output voltage VOUT. Then, the voltage at the fourth node N4 is pulled down to a threshold voltage, which is the reference voltage VREF minus the voltage difference VH. At this time, the second comparator 510 generates a reverse second control signal SC2 so as to control the square wave generator 110 to finish the current low logic period of the square wave signal S1, and the second switch 540 is closed accordingly. More particularly, a pulse of the reverse second control signal SC2 may pull down the driving signal S2 of the gate driver 115 to turn on the first PMOS transistor MP1 and turn off the first NMOS transistor MN1, such that the current low logic period of the square wave signal S1 is terminated. When the second switch 540 is closed, the voltage at the fourth node N4 is reset to the output voltage VOUT, and it may not change until the next time the square wave signal S1 enters the low logic periods.

Figure 5C:
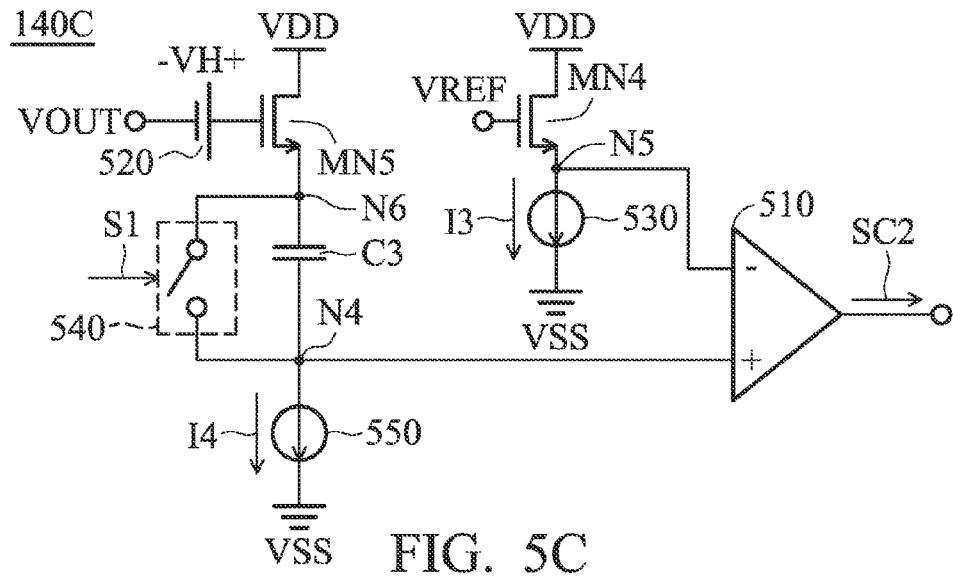
FIG. 5C is a diagram for illustrating a second control circuit according to an embodiment of the invention.

FIG. 5C is a diagram for illustrating a second control circuit 140C according to an embodiment of the invention. In the embodiment of FIG. 5C, the second control circuit 140C includes a second comparator 510, a second DC voltage source 520, a third current source 530, a second switch 540, a fourth current source 550, a third capacitor C3, a fourth NMOS transistor MN4, and a fifth NMOS transistor MN5. The second comparator 510 has a second positive input terminal coupled to a fourth node N4, a second negative input terminal coupled to a fifth node N5, and a second output terminal for outputting the second control signal SC2. The third current source 530 draws a third current I3 from the fifth node N5. The fourth NMOS transistor MN4 has a gate coupled to a reference voltage VREF, a source coupled to the fifth node N5, and a drain coupled to a supply voltage VDD. The supply voltage VDD may be the same as or different from the input voltage VIN. The fifth NMOS transistor MN5 has a gate, a source coupled to a sixth node N6, and a drain coupled to the supply voltage VDD. The second DC voltage source 520 provides a voltage difference VH. The second DC voltage source 520 has a positive electrode coupled to the gate of the fifth NMOS transistor MN5, and a negative electrode coupled to the output voltage VOUT. The third capacitor C3 is coupled between the sixth node N6 and the fourth node N4. The second switch 540 is coupled between the sixth node N6 and the fourth node N4, and is selectively closed and opened according to the square wave signal S1. The fourth current source 550 draws a fourth current I4 from the fourth node N4.

Figure 6C:
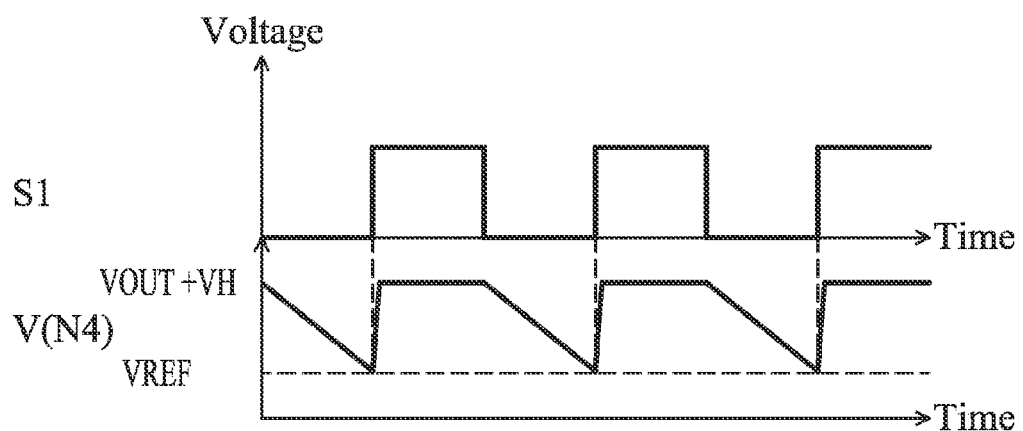
FIG. 6C is a diagram for illustrating operation of a second control circuit according to an embodiment of the invention.

FIG. 6C is a diagram for illustrating operation of the second control circuit 140C according to an embodiment of the invention. Please refer to FIG. 5C and FIG. 6C together. The output voltage VOUT includes a DC component and a relatively small AC component, and the reference voltage VREF is approximately equal to the DC component. The square wave signal S1 includes interleaved high and low logic periods. The second switch 540 is controlled by the square wave signal S1, and it is opened during the low logic periods of the square wave signal S1 and is closed during the high logic periods of the square wave signal S1. When the second switch 540 is opened, the third capacitor C3 is charged by the fourth current I4, and the voltage at the fourth node N4 is gradually decreased from the original output voltage VOUT plus voltage difference VH (the fourth NMOS transistor MN4 and the fifth NMOS transistor MN5 are respectively coupled to the second negative input terminal and the second positive input terminal of the second comparator 510, and since they provide equal gate-to-source voltage differences, the gate-to-source voltage differences can both be omitted in this discussion; that is, it is assumed that the gate-to-source voltage differences are equal to 0, and the result is unchanged). Then, the voltage at the fourth node N4 is pulled down to a threshold voltage, which is the reference voltage VREF. At this time, the second comparator 510 generates a reverse second control signal SC2 so as to control the square wave generator 110 to finish the current low logic period of the square wave signal S1, and the second switch 540 is closed accordingly. More particularly, a pulse of the reverse second control signal SC2 may pull down the driving signal S2 of the gate driver 115 to turn on the first PMOS transistor MP1 and turn off the first NMOS transistor MN1, such that the current low logic period of the square wave signal S1 is terminated. When the second switch 540 is closed, the voltage at the fourth node N4 is reset to the output voltage VOUT plus the voltage difference VH, and it may not change until the next time the square wave signal S1 enters the low logic periods.

Figure 5D:
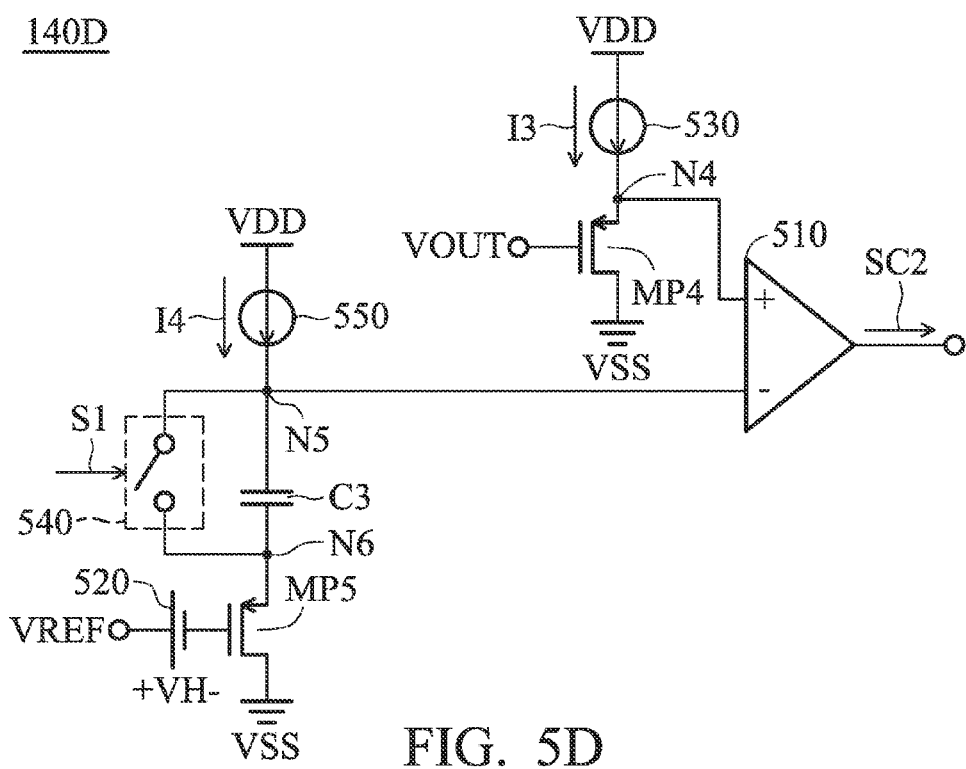
FIG. 5D is a diagram for illustrating a second control circuit according to an embodiment of the invention.

FIG. 5D is a diagram for illustrating a second control circuit 140D according to an embodiment of the invention. In the embodiment of FIG. 5D, the second control circuit 140D includes a second comparator 510, a second DC voltage source 520, a third current source 530, a second switch 540, a fourth current source 550, a third capacitor C3, a fourth PMOS transistor MP4, and a fifth PMOS transistor MP5. The second comparator 510 has a second positive input terminal coupled to a fourth node N4, a second negative input terminal coupled to a fifth node N5, and a second output terminal for outputting the second control signal SC2. The third current source 530 outputs a third current I3 to the fourth node N4. The fourth PMOS transistor MP4 has a gate coupled to the output voltage VOUT, a source coupled to the fourth node N4, and a drain coupled to the ground voltage VSS. The fourth current source 550 outputs a fourth current I4 to the fifth node N5. The third capacitor C3 is coupled between the fifth node N5 and a sixth node N6. The second switch 540 is coupled between the fifth node N5 and the sixth node N6, and is selectively closed and opened according to the square wave signal S1. The fifth PMOS transistor MP5 has a gate, a source coupled to the sixth node N6, and a drain coupled to the ground voltage VSS. The second DC voltage source 520 provides a voltage difference VH. The second DC voltage source 520 has a positive electrode coupled to a reference voltage VREF, and a negative electrode coupled the gate of the fifth PMOS transistor MP5.

Figure 6D:
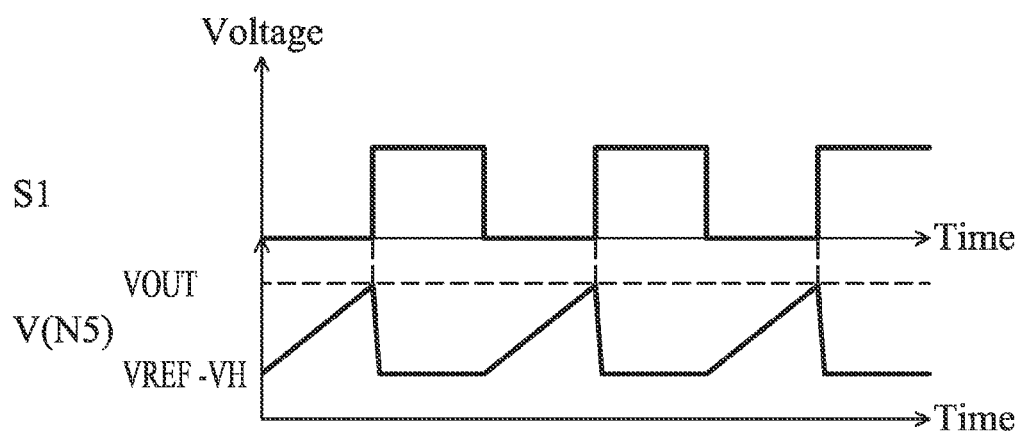
FIG. 6D is a diagram for illustrating operation of a second control circuit according to an embodiment of the invention.

FIG. 6D is a diagram for illustrating operation of the second control circuit 140D according to an embodiment of the invention. Please refer to FIG. 5D and FIG. 6D together. The output voltage VOUT includes a DC component and a relatively small AC component, and the reference voltage VREF is approximately equal to the DC component. The square wave signal S1 includes interleaved high and low logic periods. The second switch 540 is controlled by the square wave signal S1, and it is opened during the low logic periods of the square wave signal S1 and is closed during the high logic periods of the square wave signal S1. When the second switch 540 is opened, the third capacitor C3 is charged by the fourth current I4, and the voltage at the fifth node N5 is gradually increased from the original reference voltage VREF minus voltage difference VH (the fourth PMOS transistor MP4 and the fifth PMOS transistor MP5 are respectively coupled to the second positive input terminal and the second negative input terminal of the second comparator 510, and since they provide equal gate-to-source voltage differences, the gate-to-source voltage differences can both be omitted in this discussion; that is, it is assumed that the gate-to-source voltage differences are equal to 0, and the result is unchanged). Then, the voltage at the fifth node N5 is pulled up to a threshold voltage, which is the output voltage VOUT. At this time, the second comparator 510 generates a reverse second control signal SC2 so as to control the square wave generator 110 to finish the current low logic period of the square wave signal S1, and the second switch 540 is closed accordingly. More particularly, a pulse of the reverse second control signal SC2 may pull down the driving signal S2 of the gate driver 115 to turn on the first PMOS transistor MP1 and turn off the first NMOS transistor MN1, such that the current low logic period of the square wave signal S1 is terminated. When the second switch 540 is closed, the voltage at the fifth node N5 is reset to the reference voltage VREF minus the voltage difference VH, and it may not change until the next time the square wave signal S1 enters the low logic periods.

According to the embodiments of FIGS. 5A-5D and 6A-6D, the second control circuit 140 is configured to determine the end of each low logic period of the square wave signal S1. For all embodiments discussed above, the third current I3 of the third current source 530 and the fourth current I4 of the fourth current source 550 may be set according to equation (2):

$$I3=I4=VOUT \times K2. \quad (2)$$

where K2 is a second constant.

That is, each of the third current I3 and the fourth current I4 is proportional to the output voltage VOUT. According to some measurement results, such a design can cause the low logic periods of the square wave signal S1 to be well controlled, and it can therefore improve the reliability of the power converter 100. Generally speaking, the square wave signal S1 controls a charging operation of the capacitor in the second control circuit 140, and the comparator of the second control circuit 140 then generates the second control signal SC2 according to a voltage of the capacitor, the output voltage VOUT and a predetermined voltage difference VTH. In some embodiments, the second constant K2 of the equation (2) is equal to the first constant K1 of the equation (1).

The disclosure provides a power converter which is controlled by two separate control circuits. The two control circuits form different feedback paths, and respectively determine high and low logic periods of a square wave generator. By appropriately controlling the logic periods of the square wave generator, the power converter of the invention can generate a stable and precise output voltage VOUT.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power converter, comprising:
   a wave generator, receiving an input voltage, and converting the input signal into a wave signal according to a first control signal and a second control signal;
   a low pass filter, filtering the wave signal to generate an output voltage;
   a first control circuit, receiving the wave signal directly from the wave generator, the first control circuit generating the first control signal according to the wave signal and the output voltage; and
   a second control circuit, receiving the wave signal directly from the wave generator, the second control circuit generating the second control signal according to the wave signal and the output voltage;
   wherein the first control circuit comprises a first comparator and a first capacitor, the wave signal controls a charging operation of the first capacitor, and the comparator generates the first control signal according to a voltage of the first capacitor and the output voltage and a predetermined voltage difference;
   wherein the first control circuit further comprises: a first current source, outputting a first current for charging or discharging the first capacitor;
   wherein the first current is proportional to a difference between the input voltage and the output voltage;
   wherein the second control circuit comprises a second comparator and a second capacitor, the wave signal controls a charging operation of the second capacitor, and the second comparator generates the second control signal according to a voltage of the second capacitor, the output voltage and a predetermined voltage difference.

2. The power converter as claimed in claim 1, wherein the wave generator comprises:
   a driver, generating a driving signal according to the first control signal and the second control signal;
   a first PMOS transistor (P-channel Metal-Oxide-Semiconductor Field-Effect Transistor), wherein the first PMOS transistor has a gate for receiving the driving signal, a source coupled to the input voltage, and a drain coupled to a switch node; and
   a first NMOS transistor (N-channel Metal-Oxide-Semiconductor Field-Effect Transistor), wherein the first NMOS transistor has a gate for receiving the driving signal, a source coupled to a ground voltage, and a drain coupled to the switch node, wherein the switch node is used to output the wave signal.

3. The power converter as claimed in claim 1, wherein the first control circuit generates the first control signal to control falling edges of the wave signal, and the second control circuit generates the second control signal to control rising edges of the wave signal.

4. The power converter as claimed in claim 1, wherein the first control circuit further comprises:
   a second current source, outputting a second current, where the first current source is coupled to a first input terminal of the first comparator and the second current source is coupled to a second input terminal of the first comparator.

5. The power converter as claimed in claim 4, wherein the second current is proportional to a difference between the input voltage and the output voltage.

6. The power converter as claimed in claim 1, wherein the first control circuit further comprises:
   a first transistor, coupled to a first input terminal of the first comparator; and
   a second transistor, coupled to a second input terminal of the first comparator.

7. The power converter as claimed in claim 1, wherein the wave signal controls an open/closed status of a switch coupled in parallel to the first capacitor so as to control the charging operation of the first capacitor.

8. The power converter as claimed in claim 1, wherein the second control circuit further comprises:
   a first current source, outputting a first current to charge or discharge the second capacitor.

9. The power converter as claimed in claim 8, wherein the first current is proportional to the output voltage.

10. The power converter as claimed in claim 8, wherein the second control circuit further comprises:
    a second current source, outputting a second current, where the first current source is coupled to a first input terminal of the second comparator and the second current source is coupled to a second input terminal of the second comparator.

11. The power converter as claimed in claim 10, wherein the second current is proportional to the output voltage.

12. The power converter as claimed in claim 1, wherein the second control circuit further comprises:
    a first transistor, coupled to a first input terminal of the second comparator; and
    a second transistor, coupled to a second input terminal of the second comparator.

13. The power converter as claimed in claim 1, wherein the wave signal controls an open/closed status of a switch coupled in parallel to the second capacitor so as to control the charging operation of the second capacitor.

* * * * *